US008477936B2

(12) United States Patent　　(10) Patent No.: US 8,477,936 B2
Takahashi et al.　　(45) Date of Patent: Jul. 2, 2013

(54) MANAGEMENT SYSTEM INCLUDING DISPLAY APPARATUS AND DATA MANAGEMENT APPARATUS FOR DISPLAYING DATA ON THE DISPLAY APPARATUS, AND DATA ACQUISITION METHOD

(75) Inventors: Kenichi Takahashi, Sennan-gun (JP); Mitsuzo Iwaki, Osaka (JP); Daisuke Sakiyama, Kawanishi (JP); Takeshi Minami, Amagasaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 326 days.

(21) Appl. No.: 12/573,187

(22) Filed: Oct. 5, 2009

(65) Prior Publication Data

US 2010/0091987 A1　　Apr. 15, 2010

(30) Foreign Application Priority Data

Oct. 15, 2008　(JP) .................................. 2008-266749

(51) Int. Cl.
*G06F 21/00*　　(2006.01)
(52) U.S. Cl.
USPC .......... 380/44; 726/2; 726/4; 726/26; 726/27; 713/168; 713/169; 709/229; 380/54; 705/51; 455/410
(58) Field of Classification Search
USPC ............................................. 380/44; 726/27
See application file for complete search history.

(56) References Cited

U.S. PATENT DOCUMENTS

| 6,118,872 | A  | * | 9/2000 | Kashima et al. | 380/205 |
| 7,313,699 | B2 | * | 12/2007 | Koga | 713/170 |
| 7,536,709 | B2 | * | 5/2009 | Shitano | 726/2 |
| 7,987,364 | B2 | * | 7/2011 | Kaechi | 713/169 |

(Continued)

FOREIGN PATENT DOCUMENTS

JP　64-032355　2/1989
JP　2002-269020　9/2002

(Continued)

OTHER PUBLICATIONS

Srivastava et al., "Web Usage Mining: Discovery and Applications of Usage Patterns from Web Data", ACMSIGKD,Jan20froam, vol. 1, Issue 2.*

(Continued)

*Primary Examiner* — Morshed Mehedi
(74) *Attorney, Agent, or Firm* — Buchanan Ingersoll & Rooney PC

(57) ABSTRACT

In order to restrict a destination of data for security and facilitate acquisition of the data at the destination, a conference system includes an MFP and a projector, wherein the MFP prestores data for display in an HDD and includes an access key generating portion to generate an access key for an access to the display data and a data transmitting portion to transmit the display data on the condition that the access key is received from a PC, and the projector includes a wireless communication portion to wirelessly communicate with PCs within a predetermined distance, a projecting control portion to display the data stored in the HDD in the MFP, an access key acquiring portion to acquire the access key, and an access key transmitting portion to cause the wireless communication portion to transmit the access key when receiving a request from the PC via the wireless communication portion.

16 Claims, 15 Drawing Sheets

U.S. PATENT DOCUMENTS

| | | | |
|---|---|---|---|
| 2002/0194502 A1* | 12/2002 | Sheth et al. | 713/201 |
| 2003/0162540 A1* | 8/2003 | Nielsen | 455/425 |
| 2004/0019787 A1* | 1/2004 | Shibata | 713/168 |
| 2004/0230990 A1* | 11/2004 | Ikegami et al. | 725/31 |
| 2005/0114794 A1* | 5/2005 | Grimes et al. | 715/840 |
| 2005/0144134 A1* | 6/2005 | Hirano | 705/51 |
| 2006/0141986 A1* | 6/2006 | Shinozaki | 455/410 |
| 2007/0043673 A1* | 2/2007 | Hirano | 705/51 |
| 2007/0089056 A1* | 4/2007 | Taniguchi et al. | 715/700 |
| 2007/0174918 A1* | 7/2007 | Hirose et al. | 726/26 |
| 2008/0005779 A1* | 1/2008 | Takenaka et al. | 726/1 |

FOREIGN PATENT DOCUMENTS

| | | | |
|---|---|---|---|
| JP | 2005-217646 A | | 8/2005 |
| JP | 2008-171368 | * | 1/2007 |
| JP | 2007-60096 A | | 3/2007 |
| JP | 2008-171368 | | 7/2008 |

OTHER PUBLICATIONS

Notice of Ground of Rejection dated Sep. 28, 2010, issued in the corresponding Japanese Patent Application No. 2008-266749, and an English Translation thereof.

* cited by examiner

FIG. 7

| DATA IDENTIFICATION INFORMATION | PERMITTED PAGES | PERMISSION CONDITION 1 | PERMISSION CONDITION 2 | ACCESS RESTRICTION | TIME LIMIT |
|---|---|---|---|---|---|
| DOCUMENT A | PAGES 1-2 | PROJECTOR | DISPLAY | READ/PRINT | 2008/3/31 |
| DOCUMENT B | PAGE 1 | PROJECTOR | | READ | 2008/3/31 |
| DOCUMENT B | PAGE 2 | PROJECTOR | | READ | 2008/3/31 |
| DOCUMENT B | PAGE 3 | PROJECTOR | | READ | 2008/3/31 |
| DOCUMENT B | PAGE 4 | PROJECTOR | | READ | 2008/3/31 |
| DOCUMENT B | PAGE 5 | PROJECTOR | DISPLAY | READ | 2008/3/31 |
| DOCUMENT C | ALL | PROJECTOR | | READ/PRINT | 2008/4/15 |

FIG. 8

```
<key>
Url: https://10.xx.xx.166/kaigi_box/kaigi1/
Data: DOCUMENT A.pdf
Page: 1
Access: read only
Keycode: a167bf940cd67
limit: 2008/3/31 17:00
<key end>

<key>
Url: https://10.xx.xx.166/kaigi_box/kaigi1/
Data: DOCUMENT C.pdf
Page: all
Access: read/print
Keycode: bc57230de339
limit: 2008/4/15 17:00
<key end>
```

MANAGEMENT SYSTEM INCLUDING DISPLAY APPARATUS AND DATA MANAGEMENT APPARATUS FOR DISPLAYING DATA ON THE DISPLAY APPARATUS, AND DATA ACQUISITION METHOD

This application is based on Japanese Patent Application No. 2008-266749 filed with Japan Patent Office on Oct. 15, 2008, the entire content of which is hereby incorporated by reference.

BACKGROUND OF THE INVENTION

1. Field of the Invention

The present invention relates to a management system and a data acquisition method. More particularly, the present invention relates to a management system including a display apparatus such as a projector and a data management apparatus for causing the display apparatus to display data, and a data acquisition method carried out in the management system.

2. Description of the Related Art

In recent years, a projector may be employed in a conference or for a presentation. An apparatus which stores data for display transmits the data to the projector to be displayed thereon. When receiving the data, the projector throws its image onto a screen. A participant to the conference or the like may wish to obtain a document with printed images of those thrown onto the screen by the projector. To obtain the data, however, authentication with a password or the like is requested for the purposes of preserving confidentiality of the data. This means that the participant who does not know the password cannot obtain the data.

Japanese Patent Application Laid-Open No. 2005-217646 discloses an authentication method wherein when a host device finds a client device within a predetermined distance therefrom by performing short-range wireless communication, the host device generates an authentication code and sets an access right for that authentication code and stores the code in association with the access right. It then transmits the generated authentication code to the client device to cause the client device to store the code.

The conventional technique, however, allows only the client devices located within a predetermined distance from the host device to access the host device. This requires the host device to be brought to the place where the conference is held.

SUMMARY OF THE INVENTION

The present invention has been accomplished in view of the foregoing problems, and an object of the present invention is to provide a management system which ensures security by restricting a destination of data and also facilitates acquisition of the data at the destination.

In order to achieve the above-described object, according to an aspect of the present invention, a management system includes a data management apparatus which stores data and a display apparatus for displaying the data, wherein the data management apparatus includes: a data storing portion to store the data; an access key generating portion to generate an access key for an access to the data; and a data transmitting portion, on the condition that the access key is received from an external device, to transmit the data to the external device which had transmitted the access key; and the display apparatus includes: a communication portion to perform wireless communication with the external device located within a predetermined distance; a display portion to display the data stored in the data storing portion by the data management apparatus; an access key acquiring portion to acquire the access key; and an access key transmitting portion, in response to reception of a request from the external device by the communication portion, to cause the communication portion to transmit the acquired access key to the external device.

According to another aspect of the present invention, a data acquisition method is carried out by a data management apparatus and a display apparatus, the data management apparatus having a data storing portion to store data, the display apparatus displaying the data, wherein the method causes the data management apparatus to perform the steps of: generating an access key for an access to the data stored in the data storing portion; and on the condition that the data management apparatus receives the access key from an external device, transmitting the data stored in the data storing portion to the external device that had transmitted the access key, and wherein the method causes the display apparatus to perform the steps of: performing wireless communication with the external device located within a predetermined distance; displaying the data stored in the data management apparatus; acquiring the access key; and transmitting the acquired access key to the external device in response to reception of a request from the external device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows, by way of example, conditions for generating access keys.

FIG. 8 shows access keys by way of example.

DESCRIPTION OF THE PREFERRED EMBODIMENTS

Figure 1:
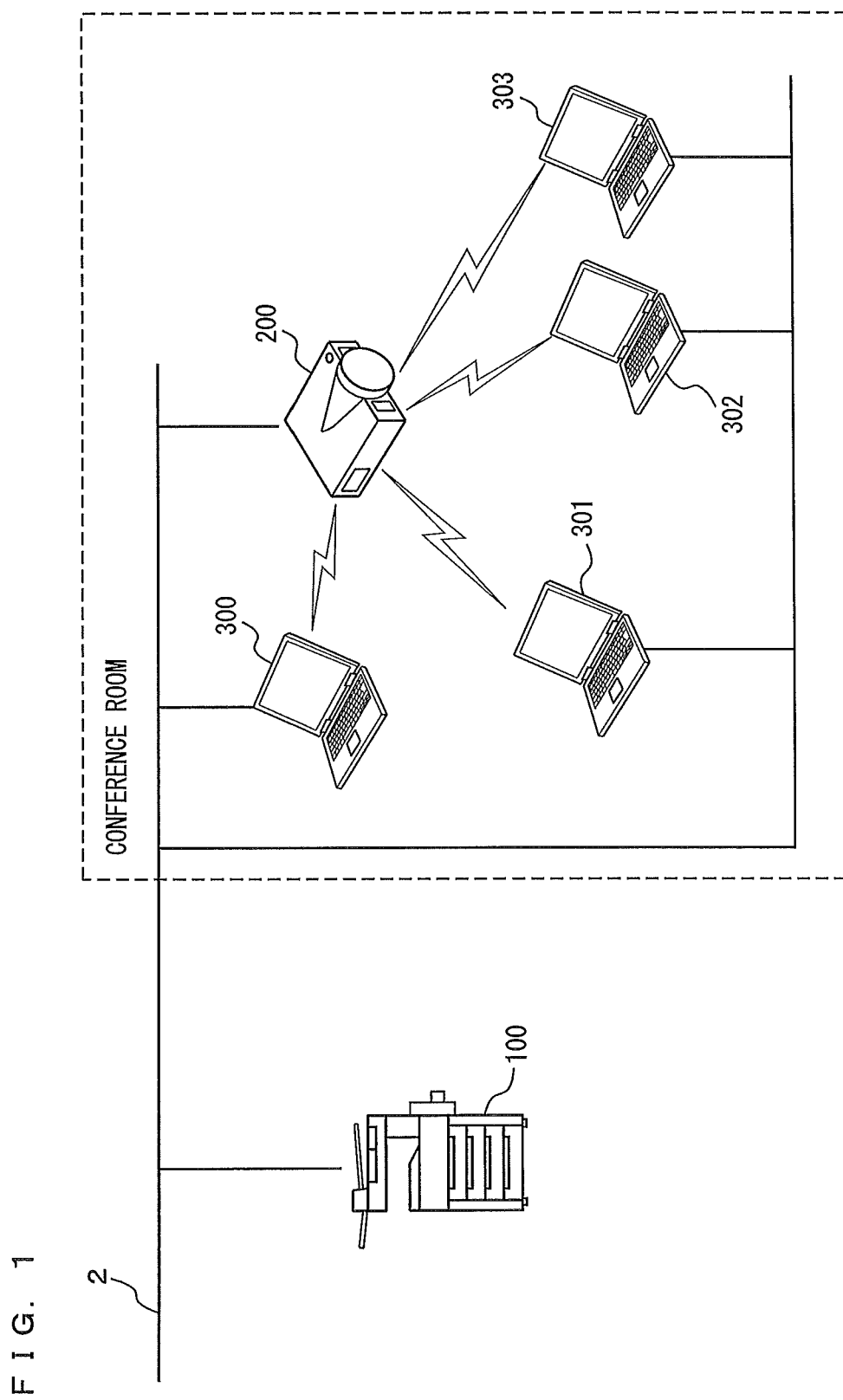
FIG. 1 is a schematic diagram of a conference system according to an embodiment of the present invention.

Embodiments of the present invention will now be described with reference to the drawings. In the following description, like reference characters denote like parts, which have like names and functions, and therefore, detailed description thereof will not be repeated.

FIG. 1 schematically shows a conference system according to an embodiment of the present invention. Referring to FIG. 1, a conference system serving as a management system includes a multi-function peripheral (MFP) 100, a projector 200, and personal computers (PCs) 300, 301, 302, and 303, which are connected to a network 2.

Network 2 is a local area network (LAN), which may be connected in a wired or wireless manner. Network 2 is not necessarily the LAN; it may be a wide area network (WAN), public switched telephone networks (PSTN), the Internet, and the like.

MFP 100, projector 200, and PCs 300 to 303 are capable of communicating with each other via network 2. It is assumed in conference system 1 of the present embodiment that projector 200 and PCs 300 to 303 are placed in a same conference room, and a presenter at the conference or his/her assistant operates projector 200 while participants to the conference operate PCs 300 to 303. In this case, the presenter may pre-store data for display (hereinafter, referred to as "display data") in MFP 100, and the presenter or the assistant may operate projector 200 to cause it to display the display data prestored in MFP 100, while the participants may operate PCs 300 to 303 to cause the corresponding PCs to store the display data that is stored in MFP 100.

Specifically, while MFP 100 outputs the prestored display data by authenticating the presenter, the participants to the conference, who are not authenticated, cannot access the display data. Thus, when MFP 100 outputs the display data in accordance with an instruction from the authenticated presenter, it issues an access code for permitting an access to the display data and transmits the access code via projector 200 to PCs 300 to 303. This allows the participants operating PCs 300 to 303 to use the access key received from projector 200 to acquire the display data from MFP 100, without being authenticated by MFP 100.

While MFP 100 is described as an example of the data management apparatus in the present embodiment, the data management apparatus may be, besides MFP 100, a scanner, a printer, a facsimile machine, a computer, and the like.

Figure 2:
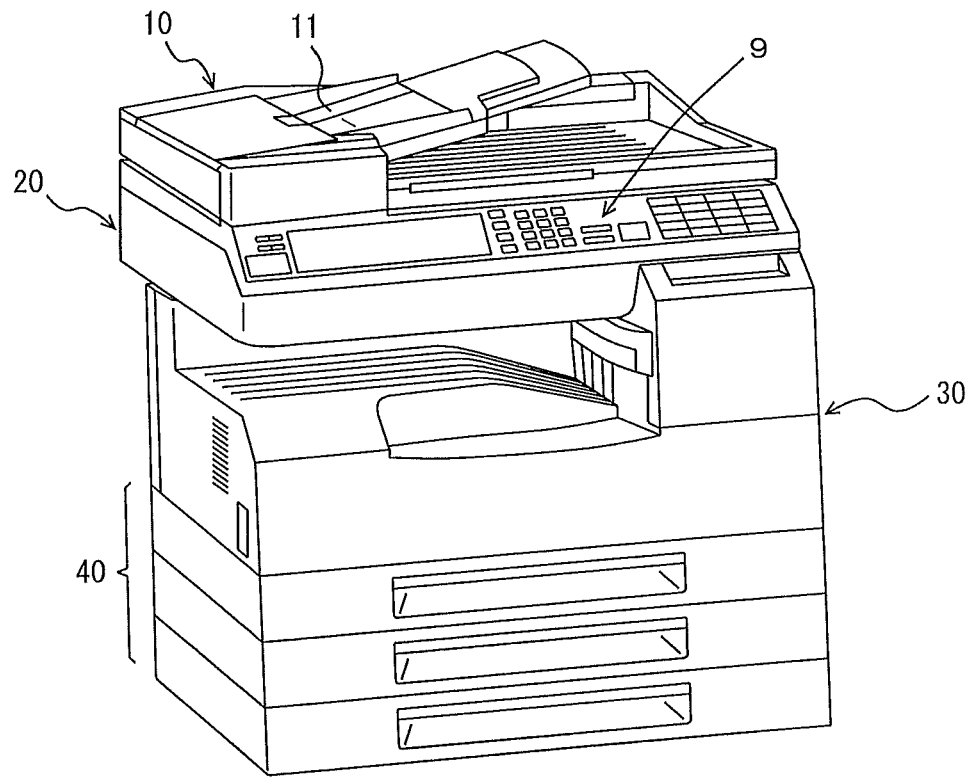
FIG. 2 is a perspective view of an MFP.

FIG. 2 is a perspective view of the MFP. Referring to FIG. 2, MFP 100 includes: an automatic document feeder (ADF) 10; an image reading portion 20; an image forming portion 30; and a paper feeding portion 40. ADF 10 delivers a plurality of originals mounted on a platform 11 one by one to image reading portion 20. Image reading portion 20 reads image information of photograph, character, picture and the like from the original in an optical manner to acquire image data.

Image forming portion 30, in receipt of the image data, forms an image on a sheet of paper based on the image data. Image forming portion 30 forms an image using toners of four colors of cyan, magenta, yellow, and black, to achieve full color printing. Alternatively, it may use one of the toners of four colors for monochrome printing.

Paper feeding portion 40 stores sheets of paper, and supplies them one by one to image forming portion 30. MFP 100 includes an operation panel 9 on its upper surface.

Figure 3:
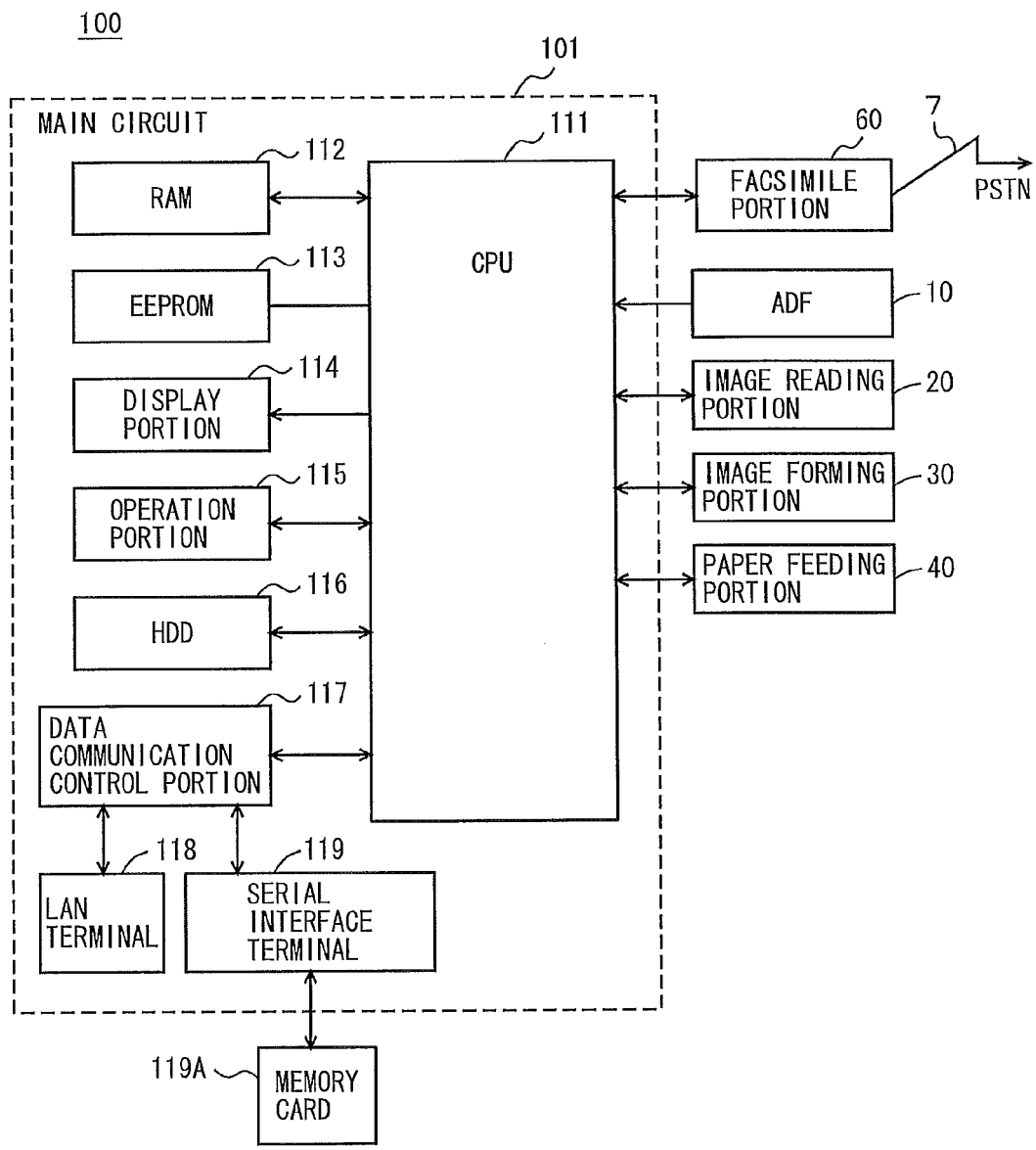
FIG. 3 is a block diagram showing an example of the hardware configuration of the MFP.

FIG. 3 is a block diagram showing an example of the hardware configuration of the MFP. Referring to FIG. 3, MFP 100 further includes a facsimile portion 60 and a main circuit 101. Main circuit 101 is connected to facsimile portion 60, ADF 10, image reading portion 20, image forming portion 30, and paper feeding portion 40. Main circuit 101 includes: a central processing unit (CPU) 111; a random access memory (RAM) 112 used as a work area for CPU 111; an electrically erasable and programmable read only memory (EEPROM) 113 for storing a program executed by CPU 111 and the like; a display portion 114; an operation portion 115; a hard disk drive (HDD) 116 as a mass storage; and a data communication control portion 117. CPU 111 is connected to display portion 114, operation portion 115, HDD 116, and data communication control portion 117, and is responsible for overall control of main circuit 101. Further, CPU 111 is connected to facsimile portion 60, ADF 10, image reading portion 20, image forming portion 30, and paper feeding portion 40, and is responsible for overall control of MFP 100.

Display portion 114 is a display such as a liquid crystal display (LCD), an organic electro-luminescence display (ELD) or the like, and displays an instruction menu for the user, information about acquired image data, and others. Operation portion 115 is provided with a plurality of keys, and accepts input of data such as instructions, characters, and numerical characters, according to the key operations by the user. Operation portion 115 includes a touch panel provided on display portion 114. Display portion 114 and operation portion 115 substantially constitute operation panel 9.

Data communication control portion 117 includes a LAN terminal 118 that is an interface for communication according to a communication protocol such as transmission control protocol (TCP) or user datagram protocol (UDP), and a serial interface terminal 119 for serial communication. Data communication control portion 117 transmits and receives data to and from an external apparatus connected to LAN terminal 118 or serial interface terminal 119, in accordance with an instruction from CPU 111.

When a LAN cable for connection with network 2 is connected to LAN terminal 118, data communication control portion 117 can communicate with projector 200 and PCs 300 to 303 via LAN terminal 118.

Further, CPU 111 controls data communication control portion 117 to read a program to be executed by CPU 111 from a memory card 119A which is connected to serial interface terminal 119, and stores the read program in RAM 112 for execution. It is noted that the recording medium for storing the program to be executed by CPU 111 is not restricted to memory card 119A. It may be a flexible disk, a cassette tape, an optical disc (compact disc-ROM (CD-ROM), magneto-optical (MO) disc, mini disc (MD), digital versatile disc (DVD)), an IC card, an optical card, or a semiconductor memory such as a mask ROM, an EPROM, an EEPROM, or the like. Alternatively, CPU 111 may download the program from a computer which is connected to network 2 or the Internet to which network 2 is connected and store the program in HDD 116, or a computer which is connected to network 2 or the Internet may write the program to HDD 116, and thereafter, the program stored in HDD 116 may be loaded to RAM 112 for execution by CPU 111. As used herein, the "program" includes, not only the one directly executable by CPU 111, but also a source program, a compressed program, an encrypted program, and others.

Facsimile portion 60 is connected to PSTN 7, and transmits facsimile data to or receives facsimile data from PSTN 7. Facsimile portion 60 stores the received facsimile data in HDD 116, or causes it to be printed on a sheet of paper by image forming portion 30. Further, facsimile portion 60 converts the data stored in HDD 116 to facsimile data, and outputs it to a facsimile machine or another MFP connected to PSTN 7. This allows the data stored in HDD 116 to be output to a facsimile machine or another MFP.

Figure 4:
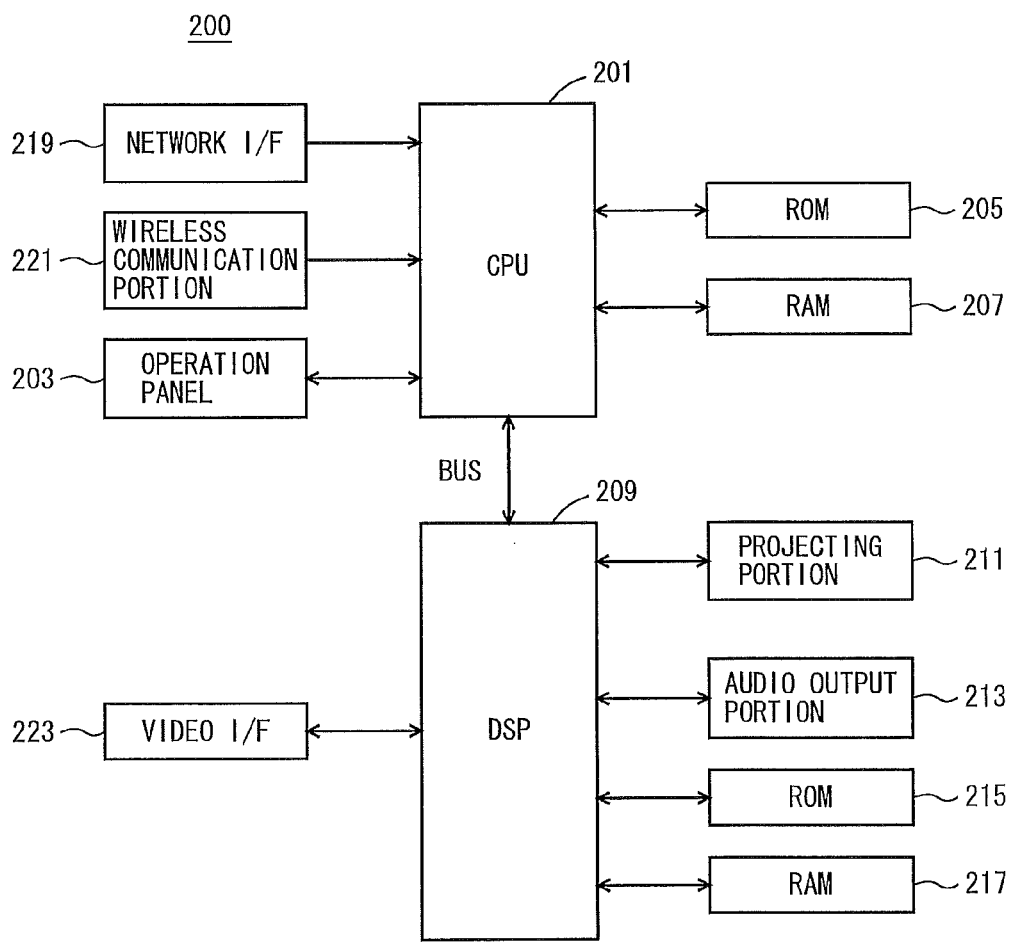
FIG. 4 is a functional block diagram showing an example of the hardware configuration of a projector.

FIG. 4 is a functional block diagram showing an example of the hardware configuration of the projector. Referring to FIG. 4, projector 200 includes: a CPU 201 responsible for overall control of projector 200; a network interface (I/F) 219 for connecting projector 200 to network 2; an operation panel 203 for accepting input of operations; a ROM 205 for storing a program to be executed by CPU 201; a RAM 207 used as a work area for CPU 201; a wireless communication portion 221 for short-range wireless communication; and a digital signal processor (DSP) 209 connected to CPU 201 via a bus. Projector 200 also includes a video I/F 223, a projecting portion 211, an audio output portion 213, a ROM 215, and a RAM 217, which are each connected to DSP 209.

Operation panel 203 is formed with a liquid crystal display and the like, and includes a display portion to display an operation screen, and an input portion configured with button keys or a touch panel. Operation panel 203 accepts operations input by an operator of projector 200, and outputs them to CPU 201.

CPU 201 communicates with MFP 100 and PCs 300 to 303 via network I/F 219. CPU 201 acquires the display data stored in MFP 100 from MFP 100 via network I/F 219 in accordance with an operation input by the presenter to operation panel 203, and outputs the acquired display data to DSP 209.

Wireless communication portion 221 is capable of short-range wireless communication. The wireless communication system employed therefor may be one using electromagnetic waves, infrared rays, or visible light as communication media. For example, the communication systems defined by the following communication standards may be used: wireless LAN, IrDA (Infrared Data Association), Bluetooth (registered trademark), and Wireless USB (Universal Serial Bus) (registered trademark). All that is needed is that wireless communication portion 221 can communicate within the range covering the area of the conference room. PCs 300 to 303 each include a wireless communication unit for communication with wireless communication portion 221. This allows CPU 201 to wirelessly communicate with PCs 300 to 303 located within a predetermined distance from projector 200 via wireless communication portion 221.

Video I/F 223 is an interface for directly connecting projector 200 to an external apparatus. Video I/F 223 may be a serial communication interface, or may be an interface for receiving analog video data. DSP 209 outputs, from among the video data input from video I/F 223, data for use in projecting (hereinafter, referred to as "projecting data") to projecting portion 211, and audio data to audio output portion 213.

DSP 209 performs decompression and image processing on the display data, and converts its format to the one suitable for projecting. It then outputs the resultant data to projecting portion 211. In the case where the display data includes audio data, DSP 209 outputs the audio data to audio output portion 213.

Projecting portion 211 includes a liquid crystal display, a lens, and a light source. The liquid crystal display displays the data input from DSP 209. The light emitted from the light source passes through the liquid crystal display, and is emitted to the outside via the lens. When the light emitted from projecting portion 211 reaches a screen, a magnified version of the image displayed on the liquid crystal display appears on the screen. In a conference room, a screen specially installed therein is employed. A wall having a highly reflective surface may be used instead of the screen, in which case installation of the screen is unnecessary.

Audio output portion 213 includes an amplifier and a speaker, and amplifies the audio data input from DSP 209 to output the sound via the speaker.

Figure 5:
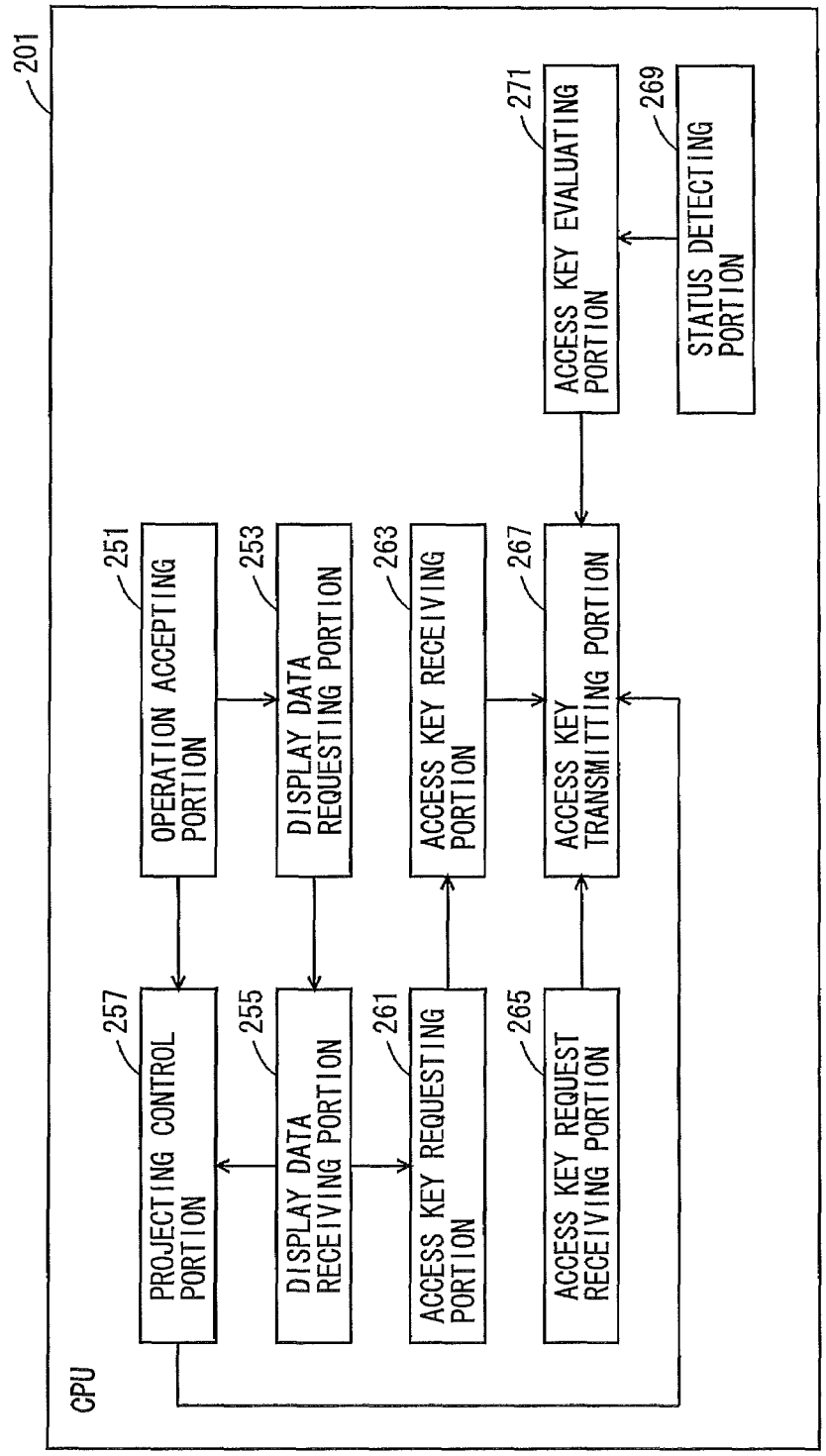
FIG. 5 is a functional block diagram schematically showing an example of the functions of a CPU included in the projector.

FIG. 5 is a functional block diagram schematically showing the functions of the CPU included in the projector. Referring to FIG. 5, CPU 201 includes: an operation accepting portion 251 to accept a user's operation; a display data requesting portion 253 to request transmission of the display data from MFP 100 in accordance with the operation; a display data receiving portion 255 to receive the display data transmitted from MFP 100; a projecting control portion 257 which causes projecting portion 211 to project the display data; an access key requesting portion 261 to request an access key from MFP 100; an access key acquiring portion 263 to acquire an access key by receiving it transmitted from MFP 100; a status detecting portion 269 to detect a status of projector 200; an access key request receiving portion 265 to receive from one of PCs 300 to 303 an access key request requesting transmission of an access key; an access key transmitting portion 267 to transmit an access key in response to reception of an access key request; and an access key evaluating portion 271 to determine whether to permit transmission of an access key.

Operation accepting portion 251 accepts an operation that an operator, i.e. the presenter in this example, inputs to operation panel 203. Operation accepting portion 251 outputs the accepted operation to display data requesting portion 253.

When an operation requesting log-in is accepted, display data requesting portion 253 establishes communication with MFP 100 via network I/F 219, and requests log-in to MFP 100. In turn, MFP 100 requests authentication information, and thus, display data requesting portion 253 displays a screen requesting input of the authentication information on operation panel 203 to prompt the presenter to input the authentication information. The authentication information is user identification information for identification of the operator and a password in this example, although biological information such as a fingerprint, iris pattern, voice pattern, or vein pattern may be used for the authentication information.

When the user inputs the authentication information to operation panel 203, operation accepting portion 251 accepts the authentication information and outputs it to display data requesting portion 253. Display data requesting portion 253 transmits the authentication information to MFP 100 via network I/F 219. In response, MFP 100 returns an authentication result, which is received by network I/F 219 and input to display data requesting portion 253.

In the case where MFP 100 authenticates the presenter, MFP 100 outputs a data list of data identification information for the data that the presenter is accessible among the data stored in HDD 116. Display data requesting portion 253 receives the data list transmitted from MFP 100 via network I/F 219, and displays the data list on operation panel 203. When the user inputs an instruction to select one of the display data from the displayed data list to operation panel 203, display data requesting portion 253 accepts the data identification information for the display data from operation accepting portion 251, and transmits the data identification information for the display data to MFP 100 via network I/F 219. In receipt of the data identification information for the display data, MFP 100 returns the display data stored in HDD 116.

Display data receiving portion 255 accepts the display data received by network I/F 219, and outputs the display data to projecting control portion 257. As a result, the image of the display data is thrown onto the screen by projecting portion 211 for display. In the case where the display data includes a plurality of pages, the presenter inputs to operation panel 203 an operation to designate a page. Projecting control portion 257 receives the operation from operation accepting portion 251, and causes projecting portion 211 to display the image corresponding to the designated page.

When display data receiving portion 255 receives the display data, access key requesting portion 261 requests an access key from MFP 100. Specifically, it transmits a signal requesting transmission of the access key to MFP 100 via network I/F 219. In the case where a predetermined condition is satisfied, MFP 100 issues and returns the access key. The predetermined conditions will be described later in detail. Access key receiving portion 263 accepts the access key received by network I/F 219, and temporarily stores it in RAM 207.

A participant to the conference who has seen the image of the display data displayed on the screen may wish to store the display data in one of PCs 300 to 303 that the participant is operating. In such a case, the participant requests the projector to transmit an access key. Specifically, an access key transmission request is output from the wireless communication unit included in the corresponding one of PCs 300 to 303.

When wireless communication portion 221 receives the access key transmission request from one of PCs 300 to 303, access key request receiving portion 265 accepts the request, and outputs the apparatus identification information for identification of the one of PCs 300 to 303 that issued the access key transmission request to access key transmitting portion 267. Here, the apparatus identification information is positional information of the position on network 2 that is assigned to a respective one of PCs 300 to 303, which may be an Internet protocol (IP) address, for example.

Status detecting portion 269 detects a status that projecting control portion 257 is projecting display data. When detecting the status that the display data is being projected, status detecting portion 269 outputs that status to access key evaluating portion 271. In the case where the display data has a plurality of pages, the status that projecting control portion 257 is projecting the display data includes the page number for specifying the page being projected.

Access key evaluating portion 271 outputs a signal enabling transmission of the access key to access key transmitting portion 267 only when the status that the display data is being displayed is input from status detecting portion 269. This means that transmission of the access key is permitted only during the period in which the display data is being displayed, which can restrict the period during which determination as to whether the participant wishes to acquire the display data can be made. In the case where the display data includes a plurality of pages, the status that the display data is being displayed includes the page number of the page being displayed, and access key evaluating portion 271 determines whether to permit transmission of the access key that corresponds to the page being displayed among the display data.

On the condition that the signal enabling transmission of the access key is input from access key evaluating portion 271, access key transmitting portion 267 transmits the access key that is input from access key receiving portion 263, via wireless communication portion 221 to the one of PCs 300 to 303 that is specified by the apparatus identification information input from access key request receiving portion 265. As a result, the access key is received at the one of PCs 300 to 303 that issued the access key transmission request.

Figure 6:
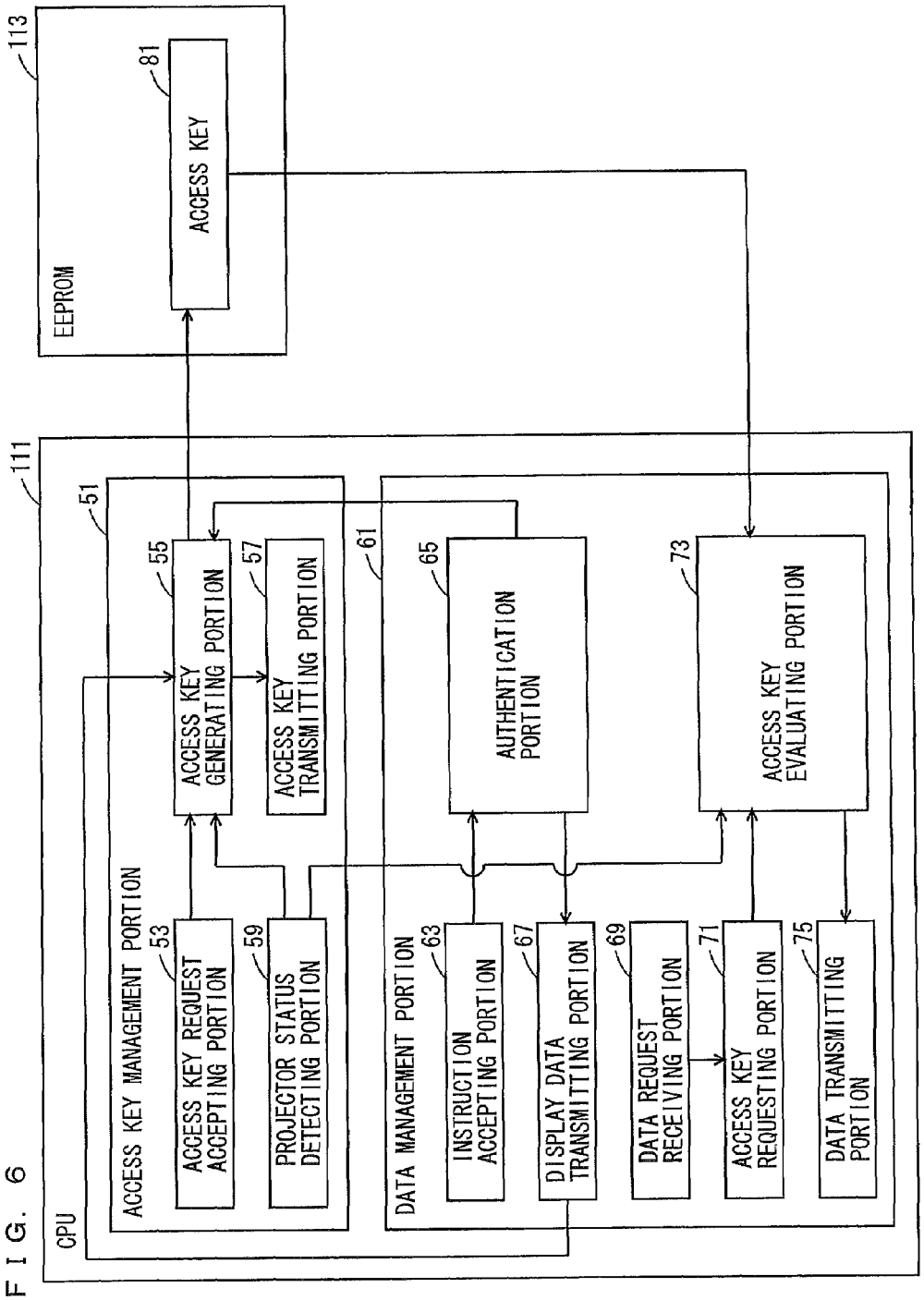
FIG. 6 is a functional block diagram schematically showing the functions of a CPU included in the MFP, together with data stored in an EEPROM.

FIG. 6 is a functional block diagram schematically showing the functions of the CPU included in the MFP, together with the data stored in the EEPROM. Referring to FIG. 6, CPU 111 included in MFP 100 includes an access key management portion 51 and a data management portion 61. Access key management portion 51 manages the access keys on a display data basis, and data management portion 61 manages the data stored in HDD 116.

Data management portion 61 includes: an instruction accepting portion 63 to accept an instruction from the outside; an authentication portion 65 for authentication of the user who issued an instruction; a display data transmitting portion 67 to transmit the display data specified by the accepted instruction from among the data stored in HDD 116; a data request receiving portion 69 to receive a data transmission request; an access key requesting portion 71 to request an access key; an access key evaluating portion 73 to evaluate an access key; and a data transmitting portion 75 to transmit data.

Instruction accepting portion 63 accepts an instruction input from the outside. Here, data communication control portion 117 establishes communication with projector 200, and when an instruction transmitted from projector 200 is received, instruction accepting portion 63 accepts the instruction received from projector 200. Instruction accepting portion 63 outputs the accepted instruction to authentication portion 65 or to display data transmitting portion 67.

When instruction accepting portion 63 accepts a log-in request transmitted from projector 200, an instruction requesting the log-in is input from instruction accepting portion 63 to authentication portion 65. In receipt of the instruction requesting the log-in, authentication portion 65 transmits a signal requesting authentication information via data communication control portion 117 to projector 200 that issued the instruction requesting the log-in. When data communication control portion 117 receives authentication information transmitted from projector 200, authentication portion 65 accepts the authentication information and determines whether to authenticate or not. MFP 100 prestores in HDD 116 sets of passwords and user identification information for identification of the users who are authorized to access the data stored in HDD 116. If the set of user identification information and password identical to the authentication information received from projector 200 is stored in HDD 116, the user is authenticated; otherwise, the user is not authenticated. Authentication portion 65 outputs the authentication result to display data transmitting portion 67 and to an access key generating portion 55 included in access key management portion 51, which will be described later in detail.

If the authentication result indicating that the authentication has been successful is input from authentication portion 65, display data transmitting portion 67 outputs a data list listing the data identification information for the data that are accessible with the user identification information of the authenticated user among the data stored in HDD 116, via data communication control portion 117 to projector 200. When data communication control portion 117 receives one of the data identification information listed in the data list, display data transmitting portion 67 transmits to projector 200 the display data specified by the received data identification information among the data stored in HDD 116. As a result, the display data can be displayed on projector 200. Display data transmitting portion 67 outputs the data identification information for the display data transmitted to projector 200, to access key generating portion 55 in access key management portion 51.

Access key management portion 51 includes: an access key request accepting portion 53 to receive an access key request; access key generating portion 55 to issue an access key; an access key transmitting portion 57 to transmit the issued access key; and a projector status detecting portion 59 to detect a status of the projector.

Projector status detecting portion 59 detects a status of projector 200, and outputs the detected status of projector 200 to access key generating portion 55 and to access key evaluating portion 73. Specifically, projector status detecting portion 59 detects a status that the communication with projector 200 is being maintained and a status that projector 200 is displaying the display data.

When data communication control portion 117 receives an access key transmission request from projector 200, access key request accepting portion 53 accepts the access key transmission request, and outputs an issuance request to access key generating portion 55.

In receipt of the issuance request, only when the authentication result indicating a success in authentication has been input from authentication portion 65, access key generating portion 55 generates an access key corresponding to the data identification information input from display data transmitting portion 67, in accordance with a predetermined generation condition. Access key generating portion 55 then outputs the generated access key to access key transmitting portion 57, and also stores it in EEPROM 113. As a result, the access key 81 is stored in EEPROM 113. Access key transmitting portion 57, in receipt of the access key from access key generating portion 55, transmits the access key to projector 200 that issued the access key transmission request.

The access key is generated on the condition that the authentication result indicating that the authentication has been successful is input from authentication portion 65. This means that the access key is generated only when the presenter having the access right to the display data is authenticated, or in other words, only when the presenter permits generation thereof.

The conditions for access key generating portion 55 to generate the access key may include, in addition to the condition that the authentication result indicating that the authentication has been successful is input from authentication portion 65, the condition that the communication with projector 200 is being maintained and/or the condition that projector 200 is displaying the display data. In this case, transmission of the access key is permitted only during the period in which the display data is being displayed, so that it is possible to restrict the period during which determination as to whether the participant wishes to acquire the display data can be made.

The conditions for generating the access keys are predetermined by the presenter for respective data items, and stored in EEPROM 113.

FIG. 7 shows, by way of example, the access key generation conditions. Referring to FIG. 7, the access key generation conditions include, for a respective page of data, a permission condition 1, a permission condition 2, access restriction, and a time limit. The permission condition 1 is set to restrict the apparatus to which the access key is to be transmitted. In FIG. 7, the apparatus identification information for projector 200 is set for all the generation conditions. The permission condition 2 indicates whether generation of the access key is permitted on the condition that the corresponding page is being displayed. The generation condition having "display" set in the "permission condition 2" field indicates that the access key is generated only when the corresponding page is being displayed; whereas the generation condition for which "display" is not set in that field indicates that the access key is generated even if the corresponding page is not being displayed. The access restriction indicates the processes that are permitted to be performed on the corresponding data. For example, when "read" is set in the "access restriction" field, display of the data is permitted, while when "print" is set therein, printing of the data is permitted. The time limit indicates the validity period of the access key. The access key generated is valid until the date that is set in the "time limit" field.

FIG. 8 shows access keys by way of example. Referring to FIG. 8, an access key includes: positional information (Url) indicating the position on network 2 of the display data to be processed; a file name (Data) of the target display data; the page number (Page) of a target page in the display data; access restriction (Access); a key code (Keycode); and a time limit (limit). The positional information and the file name constitute the data identification information. For the key code, a value generated with random numbers is set. In other words, the access key is the data in which the data identification information for the display data is associated with the key code.

Returning to FIG. 6, when data communication control portion 117 receives a display data transmission request from one of PCs 300 to 303, data request receiving portion 69 included in data management portion 61 accepts the display data transmission request as well as the apparatus identification information for the one of PCs 300 to 303 that issued the request, which is the IP address in this example, from data communication control portion 117. When accepting the display data transmission request, data request receiving portion 69 outputs a request instruction and the apparatus identification information to access key requesting portion 71.

In receipt of the request instruction, access key requesting portion 71 transmits an access key transmission request via data communication control portion 117 to the apparatus that is specified by the apparatus identification information input together with the request instruction, i.e., the one of PCs 300 to 303 that issued the display data transmission request. When data communication control portion 117 receives the access key, access key requesting portion 71 outputs the received access key to access key evaluating portion 73.

Access key evaluating portion 73 evaluates identity and validity of the access key that is input from access key requesting portion 71. For evaluation of the identity, it determines whether the access key 81 identical to the one input from access key requesting portion 71 is stored in EEPROM 113. For evaluation of the validity, it determines whether one of the following conditions, or a combination of two or more of them, is satisfied:

(1) That it is within a validity period of the access key. The validity period of the access key is set in advance in association with the display data corresponding to that access key, and the expiration date is set in the "time limit" field included in the access key.

(2) That the display data corresponding to the access key is being displayed by projector 200.

(3) That it is within a predetermined period of time after the end of display of the display data corresponding to the access key by projector 200.

(4) That communication with projector 200 is being maintained.

(5) That it is within a predetermined period of time after the end of communication that had been held with projector 200.

If access key 81 identical to the one input from access key requesting portion 71 is stored in EEPROM 113 and if the access key is determined to be valid, access key evaluating portion 73 outputs the access key to data transmitting portion 75. In receipt of the access key, data transmitting portion 75 reads the display data specified by the data identification information included in the access key from HDD 116, and transmits the read display data via data communication control portion 117 to the one of PCs 300 to 303 that issued the display data transmission request.

Figure 9:
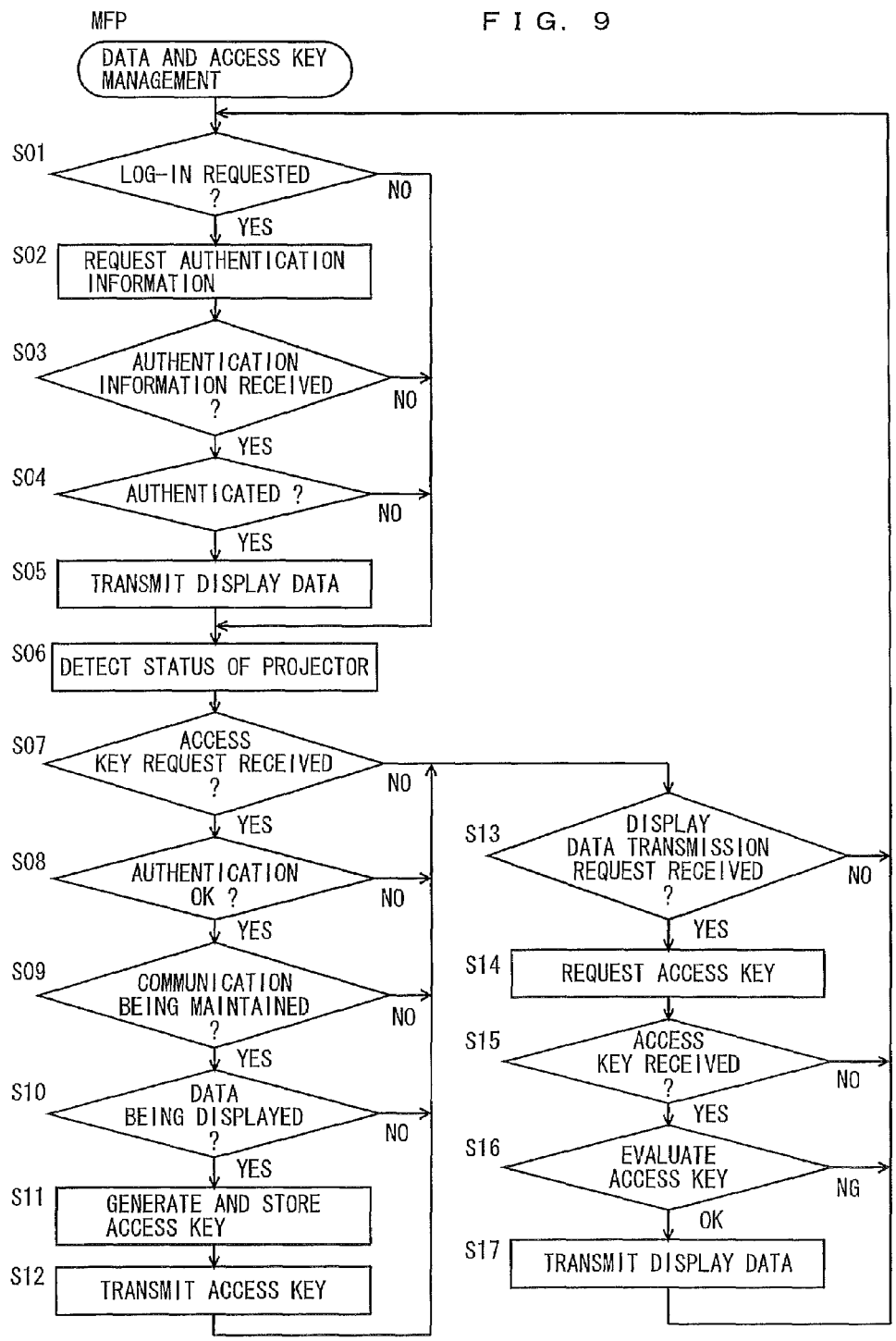
FIG. 9 is a flowchart illustrating an example of the flow of data and access key management processing.

FIG. 9 is a flowchart illustrating an example of the flow of data and access key management processing. The data and access key management processing is carried out by CPU 111 included in MFP 100 as CPU 111 executes a management program. Referring to FIG. 9, CPU 111 determines whether display data has been requested (step S01). Specifically, it determines whether data communication control portion 117 has received a request for the display data (i.e., a log-in request) from projector 200. If the request for the display data is received from data communication control portion 117, the process proceeds to step S02; otherwise, the process proceeds to step S06.

In step S02, transmission of authentication information is requested to projector 200 that issued the log-in request. If the authentication information is received from projector 200 (YES in step S03), the process proceeds to step S04; otherwise (NO in step S03), the process proceeds to step S06. In step S04, authentication is carried out based on the received authentication information. If the received authentication information matches prestored authentication information, authentication is successful; otherwise, the authentication fails. If the authentication has been successful, the process proceeds to step S05; otherwise, the process proceeds to step S06, with step S05 being skipped. In step S05, the display data is transmitted to projector 200 that issued the log-in request. For specification of the display data to be transmitted, for example, a data list listing the data identification information for the data that are accessible with the user identification information of the authenticated user among the data stored in HDD 116 is transmitted to projector 200, to receive one of the data identification information selected from among those listed in the list.

In step S06, the status of projector 200 to which the display data was transmitted in step S05 is detected. The status of the projector may include: the status that communication with projector 200 is or is not being maintained, and the status that projector 200 is or is not displaying the display data.

In the following step S07, it is determined whether a request for an access key has been received. Specifically, it is determined whether data communication control portion 117 has received an access key transmission request from projector 200. If the access key transmission request has been received from projector 200, the process proceeds to step S08; otherwise, the process proceeds to step S13.

In step S08, it is determined whether the authentication has been successful in step S04. If the user who requested transmission of the display data has been authenticated, the process proceeds to step S09; otherwise, the process proceeds to step S13. This is for generating the access key on the condition that the user who requested transmission of the display data has been authenticated.

In step S09, it is determined whether communication with projector 200 is being maintained, based on the status of projector 200 detected in step S06. If the communication is being maintained, the process proceeds to step S10; otherwise, the process proceeds to step S13. This is for generating the access key on the condition that the communication with projector 200 which requested transmission of the display data in step S01 is being maintained. In step S10, it is determined whether projector 200 is displaying the display data, based on the status of projector 200 detected in step S06. If projector 200 is displaying the display data, the process proceeds to step S11; otherwise, the process proceeds to step S13. This is for generating the access key on the condition that projector 200 which requested transmission of the display data in step S01 is displaying the display data.

In step S11, the access key corresponding to the display data which was transmitted in step S05 is generated according to the condition predetermined for that display data, and the generated access key is stored in EEPROM 113. The predetermined condition, as shown in FIG. 7 by way of example, is set by the user when the display data is stored in MFP 100. The access key is generated on the condition that the user who requested transmission of the display data has been authenticated in step S08, which ensures that the access key is generated only when permitted by the presenter. Further, the access key is generated on the conditions that it is determined in step S09 that the communication with projector 200 is being maintained and it is determined in step S10 that projector 200 is displaying the display data. Accordingly, transmission of the access key is permitted only during the period in which the display data is being displayed, and it is thus possible to restrict the period during which determination as to whether the participant wishes to acquire the display data can be made.

Then, in the following step S12, the generated access key is transmitted to projector 200 that issued the request for the access key. As a result, the access key is stored in projector 200, and projector 200 is able to transmit the access key to PCs 300 to 303 operated by the participants.

In step S13, it is determined whether a display data transmission request has been received from one of PCs 300 to 303. If so, the process proceeds to step S14; otherwise, the process returns to step S01. In step S14, the access key is requested from the one of PCs 300 to 303 that issued the display data transmission request. It is then determined whether the access key has been received from the one of PCs 300 to 303 that had requested transmission of the display data (step S15). If the access key has been received, the process proceeds to step S16; otherwise, the process returns to step S01. The display data is transmitted only when the access key is received. This prevents the display data from being transmitted to the apparatus that does not have the access key, thereby improving security.

In step S16, identity and validity of the access key received in step S15 are evaluated. If the identity and validity of the access key are verified, the process proceeds to step S17; otherwise, the process returns to step S01. Specifically, the identity of the access key is verified if access key 81 that is identical to the access key received in step S15 is stored in EEPROM 113. Further, the validity of the access key is verified if one of the following conditions, or a combination of two or more of them, is satisfied:

(1) That it is within the validity period of the access key. The validity period of the access key is checked by comparing the value which is set in the "time limit" field of the access key with the current date.

(2) That the display data corresponding to the access key is being displayed by projector 200. This is determined based on the status detected in step S06.

(3) That it is within a predetermined period of time after an end of display of the display data corresponding to the access key by projector 200. This is determined based on the status detected in step S06 and on the time that has passed from the end of display of the display data.

(4) That communication with projector 200 is being maintained. This is determined based on the status detected in step S06.

(5) That it is within a predetermined period of time after an end of communication that had been held with projector 200.

This is determined based on the status detected in step S06 and on the time that has passed from the end of the communication.

In step S17, the display data identified by the data identification information which is specified by the positional information and the file name of the access key is read from HDD 116 and transmitted to the one of PCs 300 to 303 that issued the display data transmission request. Thereafter, the process returns to step S01.

Figure 10:
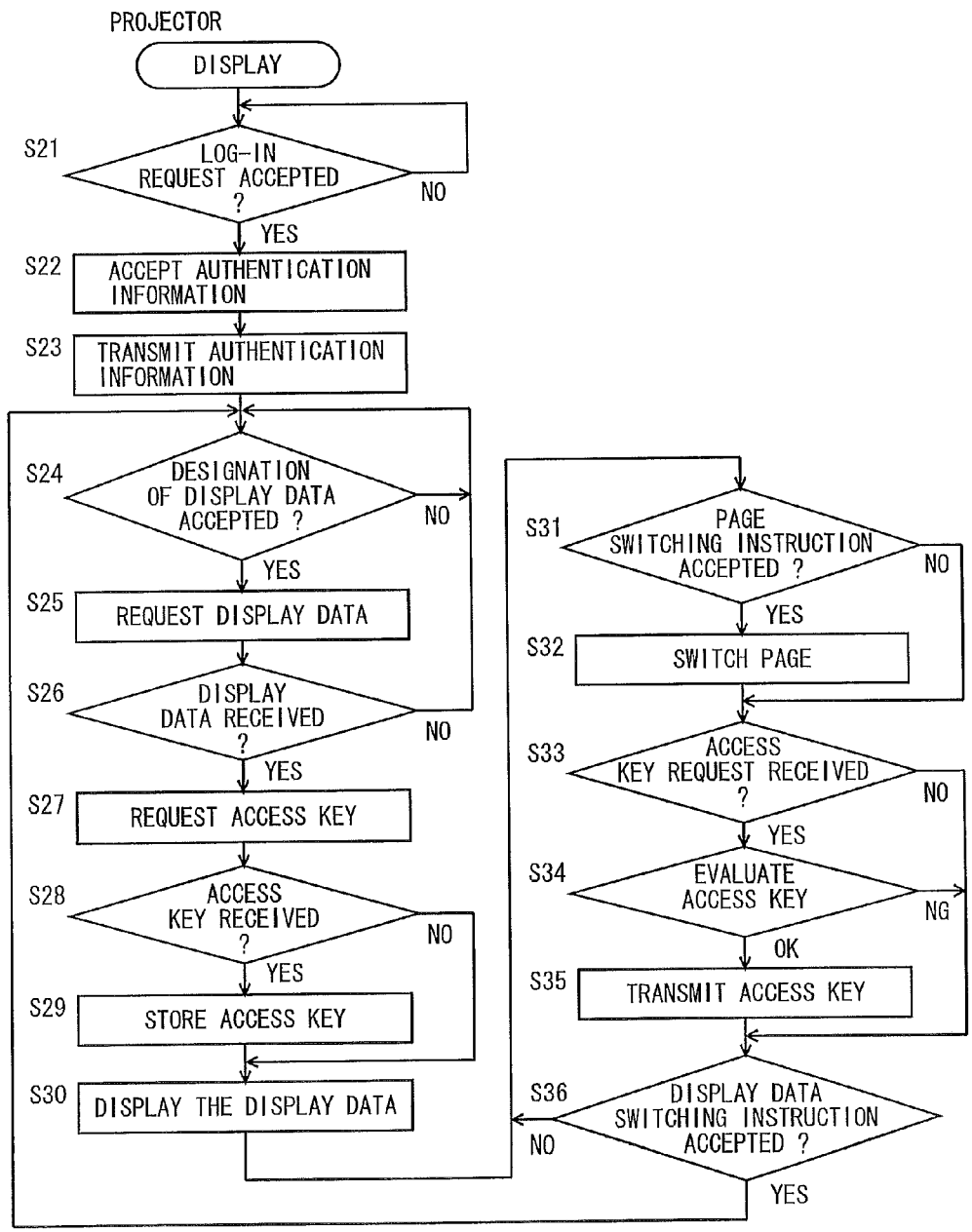
FIG. 10 is a flowchart illustrating an example of the flow of display processing.

FIG. 10 is a flowchart illustrating an example of the flow of display processing. The display processing is carried out by CPU 201 included in projector 200 as CPU 201 executes a display program, which is part of the management program. Referring to FIG. 10, CPU 201 determines whether a log-in request has been accepted (step S21). When the presenter, who is operating projector 200, inputs an operation requesting log-in to MFP 100 to operation panel 203, CPU 201 accepts the log-in request. CPU 201 is in a standby mode until a log-in request is accepted (NO in step S21), and once the log-in request is accepted (YES in step S21), the process proceeds to step S22.

CPU 201 establishes communication with MFP 100 via network I/F 219, and requests log-in to MFP 100. MFP 100 in turn requests authentication information, and thus, CPU 201 displays a screen requesting an input of the authentication information on operation panel 203 to accept the authentication information the presenter inputs to operation panel 203 (step S22). It then transmits the accepted authentication information to MFP 100 (step S23).

Next, it is determined whether designation of display data has been accepted (step S24). CPU 201 is in a standby mode until the designation of display data is accepted (NO in step S24), and once the designation of display data is accepted (YES in step S24), the process proceeds to step S25. If the authentication information is authenticated in MFP 100, a data list listing the data identification information for the data that the authenticated presenter is accessible among the data stored in MFP 100 is transmitted from MFP 100, and thus, CPU 201 displays the data list on operation panel 203. When the user inputs to operation panel 203 an instruction to select one of the data listed in the displayed data list as the display data, the designation of the display data is accepted.

In step S25, transmission of the display data is requested to MFP 100. Specifically, the data identification information for the display data designated in step S24 is transmitted to MFP 100. MFP 100 which has received the data identification information for the display data returns the display data, and CPU 201 receives the display data transmitted from MFP 100 (step S26). If the display data is received, the process proceeds to step S27; otherwise, the process returns to step S24.

In step S27, an access key corresponding to the display data received in step S26 is requested to MFP 100. If the access key is received (YES in step S28), the process proceeds to step S29; otherwise, the process proceeds to step S30. In step S29, the received access key is stored in RAM 207, and the process proceeds to step S30.

In step S30, the display data received in step S26 is displayed, and the process proceeds to step S31. Specifically, the display data is projected by projecting portion 211 so that an image of the display data is displayed on the screen.

In step S31, it is determined whether a page switching instruction has been accepted. If so, the process proceeds to step S32; otherwise, the process proceeds to step S33, with step S32 being skipped. In step S32, a page next to the one being displayed at that time among a plurality of pages included in the display data is displayed.

In step S33, it is determined whether wireless communication portion 221 has received an access key transmission request from one of PCs 300 to 303. If so, the process proceeds to step S34; otherwise, the process proceeds to step S36. In step S34, the access key that has been received is evaluated. In the case where the display data includes a plurality of pages, the access key corresponding to the page being displayed is evaluated. Specifically, if the display data that has been displayed in step S30 is being displayed, it is determined that transmission of the access key is permitted; otherwise, it is determined that transmission thereof is not permitted. If it is determined that transmission of the access key is permitted, the process proceeds to step S35; otherwise, the process proceeds to step S36, with step S35 being skipped. As such, transmission of the access key is permitted only during the period in which the display data is being displayed, which can restrict the period during which determination as to whether the participant wishes to acquire the display data can be made.

In step S35, the access key for which transmission has been permitted is transmitted to the one of PCs 300 to 303 that issued the access key transmission request, and the process proceeds to step S36. In step S36, it is determined whether an instruction to switch the display data has been accepted. If the display data switching instruction has been accepted, the process proceeds to step S24; otherwise, the process returns to step S31.

Figure 11:
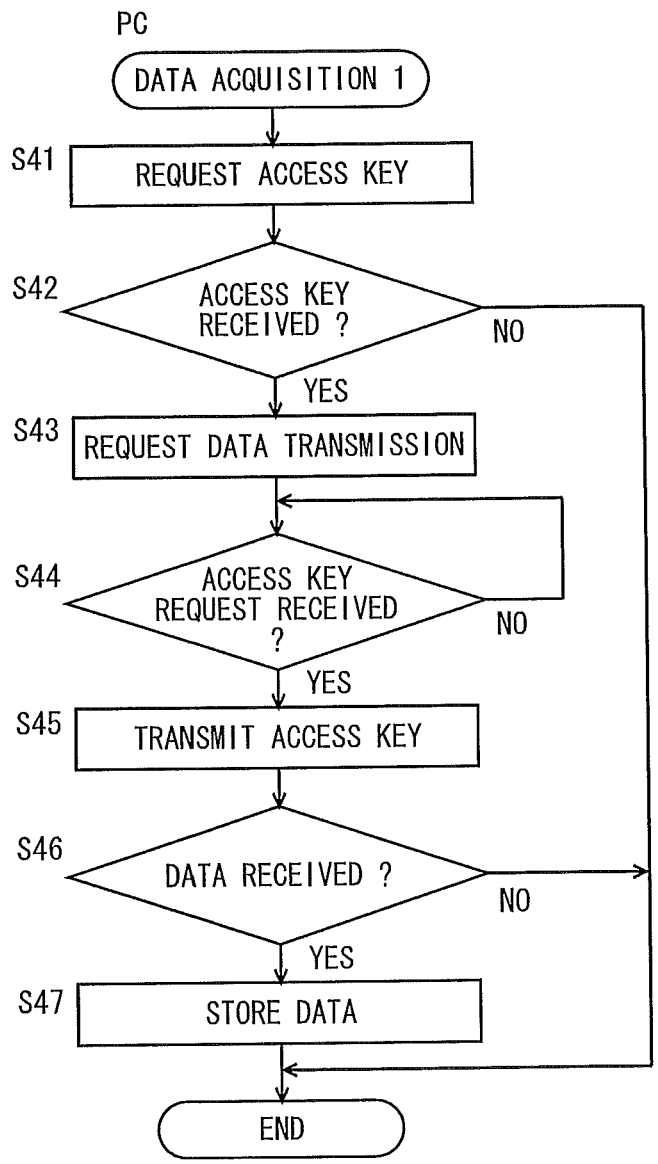
FIG. 11 is a first flowchart illustrating an example of the flow of data acquisition processing.

FIG. 11 is a first flowchart illustrating an example of the flow of data acquisition processing. The data acquisition processing is carried out by the CPU included in each of PCs 300 to 303 as the CPU executes a data acquisition program. Here, it is assumed that the CPU of PC 300 executes the data acquisition program. The data acquisition program is part of the management program.

Referring to FIG. 11, the CPU included in PC 300 requests an access key from projector 200 (step S41). When the participant who is operating PC 300 inputs an instruction to connect to projector 200, PC 300 communicates with projector 200 via short-range wireless communication to transmit an access key transmission request.

Figure 12:
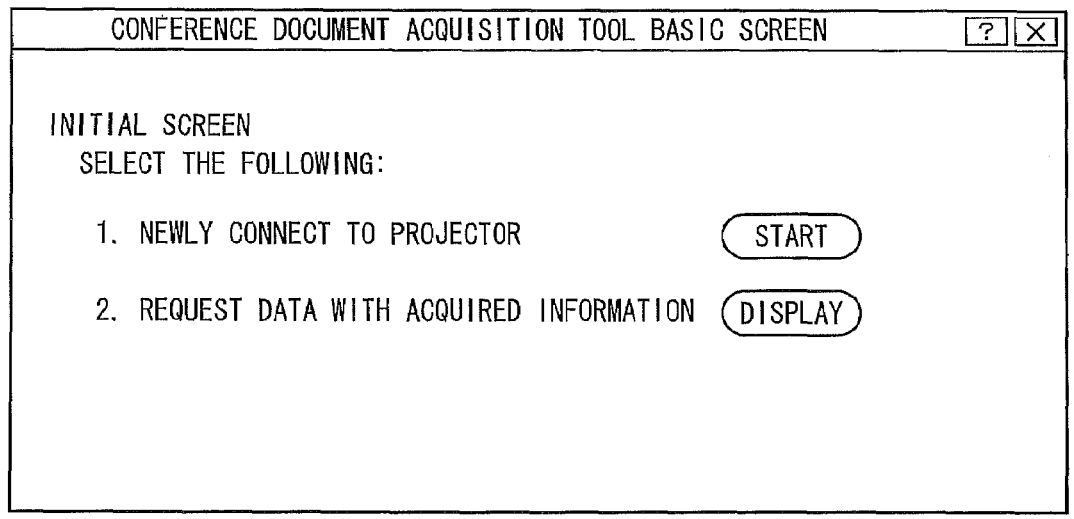
FIG. 12 shows an example of an initial screen displayed on a PC.

FIG. 12 shows an example of an initial screen that is displayed on PC 300. Referring to FIG. 12, the initial screen includes a button with the letters "START" displayed thereon, for use in selecting the menu item: "1. Newly connect to projector 200". When the button with the letters "START" is designated, PC 300 starts the short-range wireless communication with projector 200. Upon establishment of the communication with projector 200, PC 300 displays a conference document acquisition tool screen.

Figure 13:
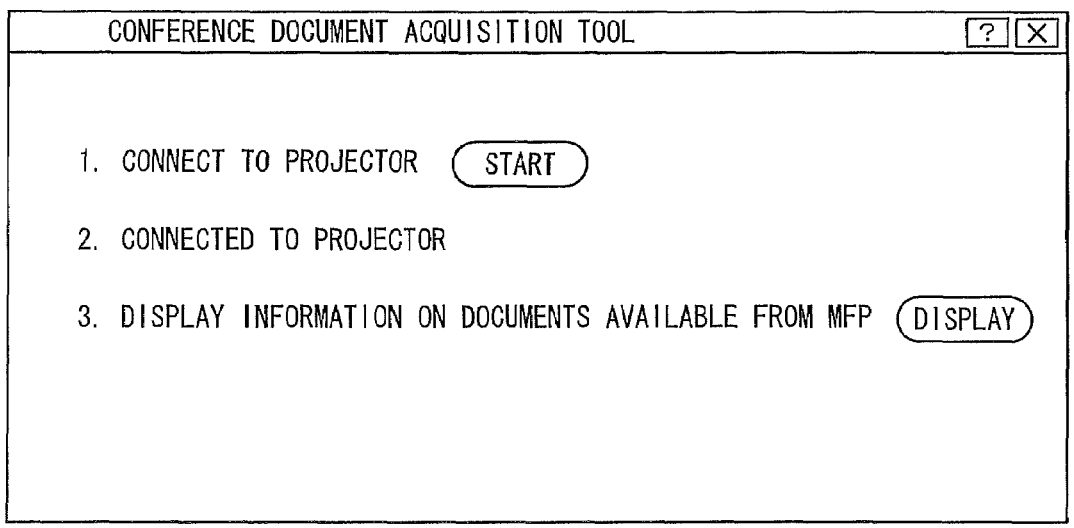
FIG. 13 is a first diagram showing an example of a conference document acquisition tool screen.

FIG. 13 is a first diagram showing an example of the conference document acquisition tool screen. The screen includes a button with the letters "DISPLAY" displayed thereon, for use in selecting the menu item: "3. Display information on documents available from MFP". When the button with the letters "DISPLAY" is designated, PC 300 transmits the access key transmission request to projector 200 via short-range wireless communication.

Returning to FIG. 11, in step S42, it is determined whether the access key has been received from projector 200. If so, the process proceeds to step S43; otherwise, the process is terminated. When the access key is received, PC 300 generates a document information screen based on the received access key, and displays the generated document information screen.

Figure 14:
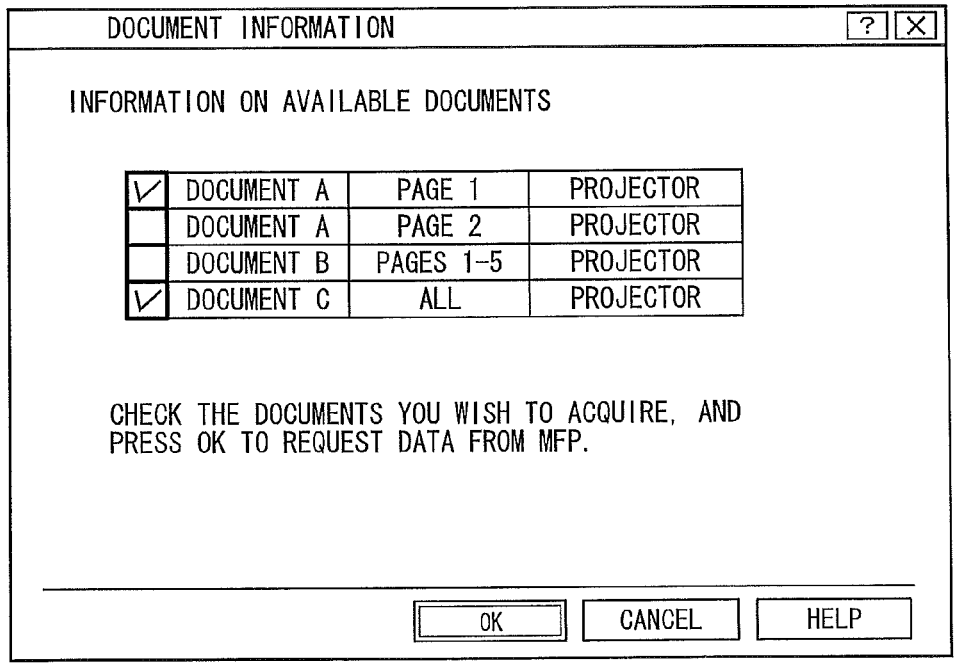
FIG. 14 shows an example of a document information screen.

FIG. 14 shows an example of the document information screen. The screen of this example is generated in the case where four access keys are received from projector 200. The document information screen includes four data identification information items corresponding respectively to the four access keys as follows: file name "Document A", page 1; file name "Document A", page 2; file name "Document B", pages 1-5; and file name "Document C", all pages; which are displayed in a selectable manner. When the user selects at least one of the four data identification information items corresponding to the four access keys and designates the button with the letters "OK" displayed thereon, PC 300 selects the designated data identification information item(s).

Returning to FIG. 11, in step S43, transmission of the data with the data identification information selected in the document information screen shown in FIG. 14 is requested to MFP 100. Specifically, a data transmission request including the data identification information selected in the document information screen shown in FIG. 14 is transmitted to MFP 100.

In step S44, it is determined whether an access key request requesting transmission of the access key has been received from MFP 100. The CPU is in a standby mode until an access key request is received (NO in step S44), and once the access key request is received (YES in step S44), the process proceeds to step S45. In step S45, the access key corresponding to the data identification information selected in the document information screen shown in FIG. 14 among the access keys received in step S42 is transmitted to MFP 100.

In step S46, it is determined whether the data corresponding to the access key has been received. If so, the process proceeds to step S47; otherwise, the process is terminated. In step S47, the received data is stored in the hard disk before the process is terminated. In the case where the data is received, PC 300 updates the conference document acquisition tool screen to make the received data accessible, and displays the updated screen.

Figure 15:
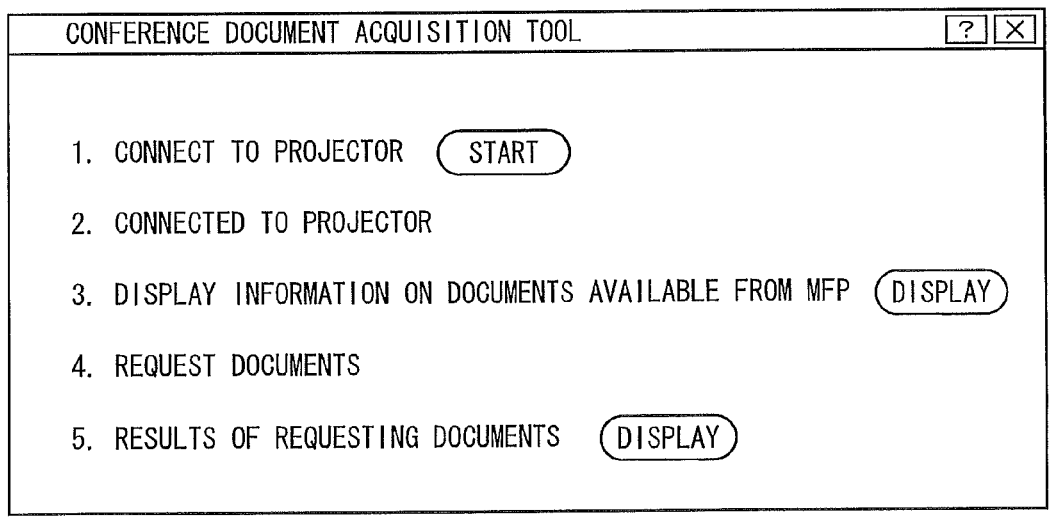
FIG. 15 is a second diagram showing an example of the conference document acquisition tool screen.

FIG. 15 is a second diagram showing an example of the conference document acquisition tool screen. This screen differs from the screen shown in FIG. 13 in that the menu items: "4. Request documents" and "5. Results of requesting documents" have been added. This can notify the participant who views the conference document acquisition tool screen that the data has been received from MFP 100. When the button with the letters "DISPLAY" thereon for use in selecting the item: "5. Results of requesting documents" is designated, PC 300 generates and displays an external device selection list screen.

Figure 16:
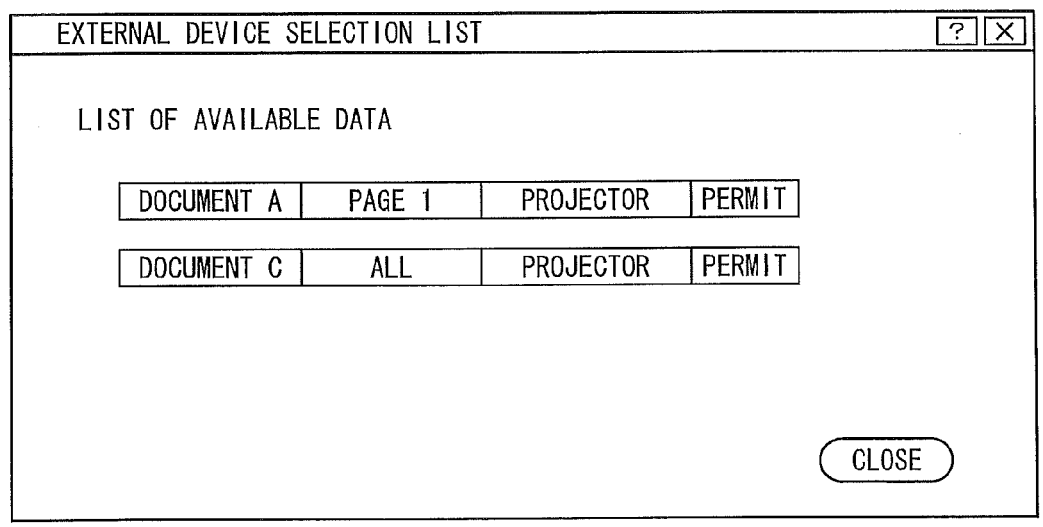
FIG. 16 shows an example of an external device selection list screen.

FIG. 16 shows an example of the external device selection list screen. Referring to FIG. 16, in the external device selection list screen, the data identification information items that have been selected in the document information screen shown in FIG. 14 are displayed in a selectable manner. When the user designates the data identification information item selectably displayed on the external device selection list screen, the data specified by the designated data identification information is displayed.

<First Modification>

In conference system 1 according to the above-described embodiment, it has been assumed that the presenter operates projector 200. Alternatively, the presenter may operate PC 300 to remotely control projector 200 from PC 300. In this case, the CPU included in PC 300 has some of the functions of CPU 201 included in projector 200 described above, and projector 200 displays the display data that is transmitted from PC 300. More specifically, the CPU of PC 300 is configured to have the functions corresponding to operation accepting portion 251, display data requesting portion 253, display data receiving portion 255, and projecting control portion 257 which are included in CPU 201 of projector 200 as shown in the functional block diagram in FIG. 5. Further, in the display processing illustrated in FIG. 10, steps S21 to S26 are carried out in PC 300.

Further, MFP 100 transmits the access key to projector 200 on the condition that the presenter, who is the user of PC 300, has logged in to MFP 100. Thus, steps S07 to S12 shown in FIG. 9 are carried out only in the case where the authentication is successful in step S04. As a result, even when the presenter is operating PC 300, the data stored in MFP 100 can be stored in PCs 301 to 303 operated by the participants, and at the same time, confidentiality of the data stored in MFP 100 can be maintained.

<Second Modification>

In conference system 1 according to the above-described embodiment, it has been assumed that the presenter operates projector 200. Alternatively, the presenter may operate PC 300 to cause projector 200 to function as a display apparatus for PC 300. In this case, PC 300 has the functions possessed by projector 200 described above. In other words, the CPU of PC 300 is configured to have the functions of CPU 201 of projector 200 shown in FIG. 5, and the processing illustrated in FIG. 10 is carried out by the CPU of PC 300.

<Third Modification>

In conference system 1 according to the above-described embodiment, the participants to the conference do not know the data identification information for the display data stored in MFP 100. In conference system 1 according to the third modification, the data identification information for the display data being stored in MFP 100 is known to the participants. The data identification information for the display data is notified in advance via an invitation to the conference, via e-mail, or the like.

Figure 17:
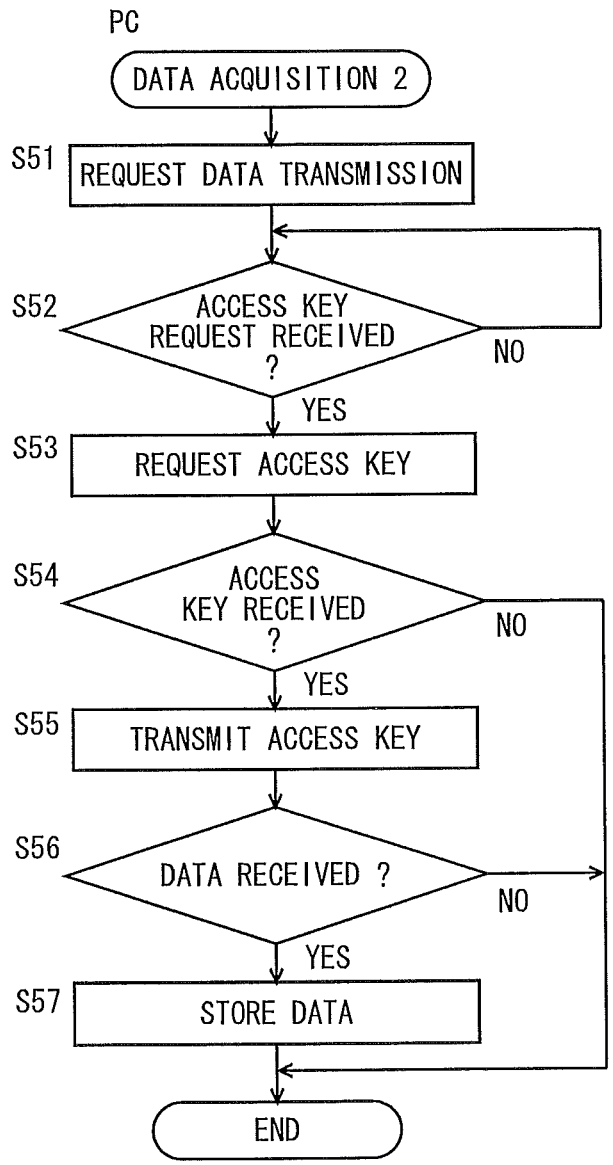
FIG. 17 is a second flowchart illustrating an example of the flow of the data acquisition processing.

FIG. 17 is a second flowchart illustrating an example of the data acquisition processing. The data acquisition processing is carried out by the CPU included in each of PCs 300 to 303, as the CPU executes the data acquisition program. Here, it is assumed that the CPU in PC 300 executes the data acquisition program. The data acquisition program is part of the management program.

Referring to FIG. 17, the CPU included in PC 300 requests transmission of data from MFP 100 (step S51). When the participant inputs to PC 300 the data identification information for the display data that is known in advance, PC 300 transmits a data transmission request including the data identification information to MFP 100 that is specified by the data identification information.

MFP 100 that has received the data transmission request in turn requests an access key (step S14 in FIG. 9). PC 300 determines whether the access key request requesting transmission of the access key has been received from MFP 100 (step S52). The CPU is in a standby mode until an access key request is received (NO in step S52), and once the access key request is received (YES in step S52), the process proceeds to step S53.

In the following step S53, transmission of the access key is requested to projector 200. Specifically, PC 300 communicates with projector 200 via short-range wireless communication, to transmit the access key transmission request thereto. In the following step S54, it is determined whether the access key has been received from projector 200. If the access key has been received, the process proceeds to step S55; otherwise, the process is terminated.

The access key received in step S54 is transmitted to MFP 100 (step S55). MFP 100, in receipt of the access key, returns the display data (step S17 in FIG. 9). In step S56, it is determined whether the data corresponding to the access key has been received. If the data has been received, the process proceeds to step S57; otherwise, the process is terminated. In step S57, the received data is stored in the hard disk before termination of the process.

As described above, conference system 1 serving as the management system in the present embodiment includes: MFP 100 serving as the data management apparatus which stores data, and projector 200 serving as the display apparatus which displays the data. MFP 100 prestores data for display in HDD 116, and includes: access key generating portion 55 to generate an access key for an access to the display data; and data transmitting portion 75 to transmit the display data on the condition that an access key is received from one of PCs 300 to 303. Projector 200 includes: wireless communication portion 221 to perform wireless communication with PCs 300 to 303 located within a predetermined distance; projecting control portion 257 to display the data stored in HDD 116 by MFP 100; access key receiving portion 263 to acquire the access key by receiving it; and access key transmitting portion 267 to cause wireless communication portion 221 to transmit the access key in response to the event that wireless communication portion 221 receives a request from one of PCs 300 to 303. As such, projector 200 performs wireless communication with PCs 300 to 303 located within a predetermined distance from the projector to transmit the access keys generated in MFP 100. This can restrict the destinations of the data stored in HDD 116 in MFP 100 to PCs 300 to 303 that are located within the predetermined distance from projector 200. Further, PCs 300 to 303 each receive the display data stored in HDD 116 in MFP 100 using the received access key. This facilitates reception of the data stored in HDD 116 in MFP 100.

Furthermore, access key transmitting portion 267 included in projector 200 may transmit the access key on the condition that projecting control portion 257 is displaying the display data. This can restrict the period during which the access key is transmitted.

Still further, access key generating portion 55 included in MFP 100 may generate the access key on the condition that the administrator of the display data is authenticated. This prevents the display data from being transmitted to the outside without the knowledge of the administrator.

MFP 100 may further include projector status detecting portion 59 to detect the status of projector 200, and access key generating portion 55 may generate the access key on the condition that the status that projector 200 is displaying the display data is detected. In this case, the access key is generated only during the period in which the display data is being displayed by projector 200, which can suppress transmission of the display data that is not being displayed.

Moreover, MFP 100 may further include projector status detecting portion 59 to detect the status of projector 200, and access key generating portion 55 may generate the access key on the condition that communication with projector 200 is being maintained. In this case, the access key is generated only during the period in which the communication with projector 200 is being maintained, which can restrict the timing of generating the access key.

Furthermore, the display data may include at least one page data, and projector 200 may display the display data in the unit of the page data included in the display data. The access key may include: a first access key which permits an access to the page data that is being displayed by projector 200; and a second access key which permits an access to all of one or more page data included in the data. In this manner, the access keys can be generated in units of pages, and accordingly, the display data can be transmitted in units of pages.

Still further, HDD 116 may include one or more storage areas (BOX), and the display data may be stored in one of the one or more storage areas (BOX). In this case, the access key may further include a third access key which permits an access to all the data stored in the storage area in which the data is stored, among the one or more storage areas (BOX). As such, it is possible to generate an access key for permitting accesses to a plurality of data items. This allows the user of any of PCs 300 to 303 to use a single access key to acquire a plurality of data items.

Furthermore, the validity period may be set for each access key, and MFP 100 may further include access key evaluating portion 73 which detects that the generated access key is within its validity period set in advance. In this case, data transmitting portion 75 transmits the display data to the one of PCs 300 to 303 which issued the access key, on the condition that the generated access key is within its validity period. In this manner, the validity period can be set for the access key, and thus, it is possible to restrict the period during which the display data can be acquired.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A management system including a data management apparatus which stores data and a display apparatus for displaying the data, said data management apparatus comprising:
   a data storing portion to store the data including a plurality of page data;
   an access key generating portion to generate an access key for an access to each of the plurality of page data included in said data; and
   a data transmitting portion, on a condition that said access key is received from an external device, to transmit page data corresponding to said access key among the plurality of page data included in said data to said external device which had transmitted the access key;
   said display apparatus comprising:
   a communication portion to perform wireless communication with said external device located within a predetermined distance;
   a display portion to display said data stored in said data storing portion by said data management apparatus;
   an access key acquiring portion to acquire said access key; and
   an access key transmitting portion, in response to reception of a request from said external device by said communication portion, to cause said communication portion to transmit said acquired access key to said external device,
   wherein said access key generating portion, on a condition that a state of said display portion displaying any one of the plurality of page data included in said data is detected, generates said access key for an access to said displayed page data, wherein said display portion included in said display apparatus displays said data in units of the page data included in said data, and
   wherein said display portion included in said display apparatus displays said data in units of the page data included in said data, and
   wherein the access key includes a first access key permitting an access to the one of the plurality of page data that is being displayed by said display portion, and a second access key permitting an access to all of the plurality of page data included in said data.

2. The management system according to claim 1, wherein said access key transmitting portion included in said display apparatus transmits said acquired access key on a condition that said display portion is displaying said data.

3. The management system according to claim 1, wherein said access key generating portion included in said data management apparatus generates said access key further on a condition that an administrator of said data is authenticated.

4. The management system according to claim 1, wherein said data management apparatus further includes a status detecting portion to detect a status of said display apparatus.

5. The management system according to claim 1, wherein
said data management apparatus further includes a status detecting portion to detect a status of said display apparatus, and
said access key generating portion generates said access key further on a condition that communication with said display apparatus is being maintained.

6. The management system according to claim 1, wherein said data storing portion included in said data management apparatus includes one or more storage areas, said data is stored in one of said one or more storage areas, and said access key further includes a third access key permitting an access to all the data stored in the one of said one or more storage areas in which said data is stored.

7. A management system including a data management apparatus which stores data and a display apparatus for displaying the data, said data management apparatus comprising:
a data storing portion to store the data including a plurality of page data;
an access key generating portion to generate an access key for an access to each of the plurality of page data included in said data; and
a data transmitting portion, on a condition that said access key is received from an external device, to transmit page data corresponding to said access key among the plurality of page data included in said data to said external device which had transmitted the access key; said display apparatus comprising:
a communication portion to perform wireless communication with said external device located within a predetermined distance;
a display portion to display said data stored in said data storing portion by said data management apparatus;
an access key acquiring portion to acquire said access key; and
an access key transmitting portion, in response to reception of a request from said external device by said communication portion, to cause said communication portion to transmit said acquired access key to said external device,
wherein said access key generating portion, on a condition that a state of said display portion displaying any one of the plurality of page data included in said data is detected, generates said access key for an access to said displayed page data, wherein said access key has a validity period set therefor,
wherein said data management apparatus further comprises a validity detecting portion to detect that said generated access key is within its validity period set in advance,
wherein said data transmitting portion transmits said data to said external device that had transmitted the access key, on a condition that said generated access key is within its validity period,
wherein said display portion included in said display apparatus displays said data in units of the page data included in said data, and
wherein said access key includes a first access key permitting an access to the one of the plurality of page data that is being displayed by said display portion, and a second access key permitting an access to all of the plurality of page data included in said data.

8. The management system according to claim 7, wherein said validity period is a period during which said data is being displayed by said display portion.

9. The management system according to claim 7, wherein said validity period is a period within a predetermined period of time after an end of display of said data by said display portion.

10. The management system according to claim 7, wherein said validity period is a period during which communication with said display apparatus is being maintained.

11. The management system according to claim 7, wherein said validity period is a period within a predetermined period of time after an end of communication that had been held with said display apparatus.

12. The management system according to claim 7, wherein said validity period is a period that is set in advance in association with said data.

13. A data acquisition method carried out by a data management apparatus and a display apparatus, the data management apparatus having a data storing portion to store data including a plurality of page data, the display apparatus displaying the data, the method causing said data management apparatus to perform the steps of:
on a condition that any one of the plurality of page data included in said data is displayed, generating an access key for an access to the displayed page data included in the data stored in said data storing portion; and
on a condition that said data management apparatus receives said access key from an external device, transmitting the displayed page data according to said access key included in the data stored in said data storing portion to said external device that had transmitted the access key;
the method causing said display apparatus to perform the steps of: performing wireless communication with said external device located within a predetermined distance;
displaying said data stored in said data management apparatus;
acquiring said access key; and
transmitting said acquired access key to said external device in response to reception of a request from said external device,
wherein said display portion included in said display apparatus displays said data in units of the page data included in said data, and
wherein the access key includes a first access key permitting an access to the one of the plurality of page data that is being displayed by said display portion, and a second access key permitting an access to all of the plurality of page data included in said data.

14. The management system according to claim 1, wherein the display apparatus is detachably linked to the data management apparatus.

15. The data acquisition method according to claim 13, wherein the display apparatus is detachably linked to the data management apparatus.

16. A data acquisition method carried out by a data management apparatus and a display apparatus, the data management apparatus having a data storing portion to store data including a plurality of page data, the display apparatus displaying the data, the method causing said data management apparatus to perform the steps of:

- on a condition that any one of the plurality of page data included in said data is displayed, generating an access key for an access to the displayed page data included in the data stored in said data storing portion, the access key having a validity period set therefor; and
- on a condition that said data management apparatus receives said access key from an external device and detects that said generated access key is within the validity period, transmitting the displayed page data according to the access key included in the data stored in said data storing portion to said external device that had transmitted the access key;

the method causing said display apparatus to perform the steps of:

- performing wireless communication with said external device located within a predetermined distance;
- displaying said data stored in said data management apparatus;
- acquiring said access key; and
- transmitting said acquired access key to said external device in response to
- reception of a request from said external device, wherein said display portion included in said display apparatus displays said data in units of the page data included in said data, and wherein said access key includes a first access key permitting an access to the one of the plurality of page data that is being displayed by said display portion, and a second access key permitting an access to all of the plurality of page data included in said data.

* * * * *